US010121996B2

(12) United States Patent
Lee et al.

(10) Patent No.: US 10,121,996 B2
(45) Date of Patent: Nov. 6, 2018

(54) RECHARGEABLE BATTERY

(71) Applicant: Samsung SDI Co., Ltd., Yongin-si, Gyeonggi-do (KR)

(72) Inventors: Youngjun Lee, Yongin-si (KR); Youngmin Kim, Yongin-si (KR); Jaemin Lim, Yongin-si (KR); Hyunjun Choi, Yongin-si (KR); Euysun Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 29 days.

(21) Appl. No.: 15/343,062

(22) Filed: Nov. 3, 2016

(65) Prior Publication Data

US 2017/0125751 A1 May 4, 2017

(30) Foreign Application Priority Data

Nov. 4, 2015 (KR) .................. 10-2015-0154756

(51) Int. Cl.
| | |
|---|---|
| *H01M 2/06* | (2006.01) |
| *H01M 2/08* | (2006.01) |
| *H01M 2/30* | (2006.01) |
| *H01M 2/04* | (2006.01) |
| *H01M 2/20* | (2006.01) |

(52) U.S. Cl.
CPC ......... *H01M 2/06* (2013.01); *H01M 2/0473* (2013.01); *H01M 2/08* (2013.01); *H01M 2/202* (2013.01); *H01M 2/30* (2013.01); *H01M 2220/30* (2013.01)

(58) Field of Classification Search
CPC ............ H01M 2/02; H01M 2/08; H01M 2/30
See application file for complete search history.

(56) References Cited

U.S. PATENT DOCUMENTS

| | | | |
|---|---|---|---|
| 7,993,777 B2 | 8/2011 | Kang | |
| 8,263,240 B2 * | 9/2012 | Uh | ..................... H01M 2/0404 277/650 |
| 2013/0337306 A1 * | 12/2013 | Han | .................... H01M 2/1016 429/99 |

FOREIGN PATENT DOCUMENTS

| | | |
|---|---|---|
| KR | 10-2006-0097479 A | 9/2006 |
| KR | 10-2006-0097480 A | 9/2006 |
| KR | 10-2007-0088894 A | 8/2007 |
| KR | 10-2008-0039090 A | 5/2008 |

\* cited by examiner

*Primary Examiner* — Karie O'Neill Apicella
(74) *Attorney, Agent, or Firm* — Knobbe Martens Olson & Bear LLP (57) ABSTRACT

A rechargeable battery is disclosed. In one aspect, the battery includes a case, an electrode terminal connected to the case and having a first exposed area, and an insulation gasket interposed between the electrode terminal and the case and partially covered by the electrode terminal. The insulation gasket has a second exposed area, and the second exposed area is greater than or equal to the first exposed area.

17 Claims, 6 Drawing Sheets

RECHARGEABLE BATTERY

CROSS-REFERENCE TO RELATED APPLICATION

This application claims the benefit of Korean Patent Application No. 10-2015-0154756, filed on Nov. 4, 2015, in the Korean Intellectual Property Office, the disclosure of which is incorporated herein in its entirety by reference.

BACKGROUND

Field

The described technology generally relates to a rechargeable battery.

Description of the Related Technology

Along with the development of wireless Internet and communication technology, the popularity of electronic devices such as cellular phones or portable computers equipped with rechargeable batteries instead of power supplies has grown considerably. Such electronic devices may be used anywhere without being limited to places where power outlets are available.

SUMMARY OF CERTAIN INVENTIVE ASPECTS

One inventive aspect relates to a rechargeable battery including an insulation gasket configured according to design specifications for preventing a short circuit between an electrode terminal and a case.

Another aspect is a rechargeable battery that includes: a case to which an electrode terminal is coupled; and an insulation gasket surrounding the electrode terminal to insulate the electrode terminal from the case, wherein the electrode terminal has an exposed area on the case and the insulation gasket has an exposed area on the case, and the exposed area of the insulation gasket is equal to or greater than the exposed area of the electrode terminal.

The exposed area of the insulation gasket may completely surround the exposed area of the electrode terminal.

The electrode terminal may have a quadrangular shape with first and second sides extending in different directions, and the insulation gasket may surround the electrode terminal and may have a quadrangular shape with first and second sides parallel with the first and second sides of the electrode terminal.

The electrode terminal and the insulation gasket may satisfy a relationship of a>b where "a" denotes a distance between the first sides of the electrode terminal and the insulation gasket, and "b" denotes a distance between the second sides of the electrode terminal and the insulation gasket.

The first sides of the electrode terminal and the insulation gasket may be parallel with a long side of the case, and the second sides of the electrode terminal and the insulation gasket may be parallel with a short side of the case.

The rechargeable battery may further include a bus bar connected to the electrode terminal, wherein the bus bar may cross the first side of the electrode terminal and may extend to an outside of the case.

The insulation gasket may protrude from the case, and electrode terminal may protrude from the insulation gasket.

A first slope between a vertex of the electrode terminal and a vertex of the insulation gasket may be smaller than a second slope between the vertex of the electrode terminal and a vertex of the case.

The first and second slopes may be defined in a section crossing a long side of the case.

The rechargeable battery may further include a bus bar electrically connected to the electrode terminal.

The bus bar may cross a long side of the case and may extend to an outside of the case.

The bus bar may include a flexible conductive member.

Another aspect is a rechargeable battery comprising: a case; an electrode terminal connected to the case and having a first exposed area; and an insulation gasket interposed between the electrode terminal and the case and partially covered by the electrode terminal, wherein the insulation gasket has a second exposed area, and wherein the second exposed area is greater than or equal to the first exposed area.

In the above rechargeable battery, the second exposed area completely surrounds the first exposed area.

In the above rechargeable battery, the electrode terminal has a quadrangular shape having first and second sides extending in different directions, wherein the insulation gasket surrounds the electrode terminal and has a quadrangular shape having first and second sides substantially parallel with the first and second sides of the electrode terminal, respectively.

In the above rechargeable battery, the electrode terminal and the insulation gasket satisfy the relationship of a>b, wherein "a" represents the distance between the first sides of the electrode terminal and the insulation gasket, and wherein "b" represents the distance between the second sides of the electrode terminal and the insulation gasket.

In the above rechargeable battery, the case has a first side and a second side shorter than the first side, wherein the first sides of the electrode terminal and the insulation gasket are substantially parallel with the first side of the case, and wherein the second sides of the electrode terminal and the insulation gasket are substantially parallel with the second side of the case.

The above rechargeable battery further comprises a bus bar electrically connected to the electrode terminal, wherein the bus bar crosses the first side of the electrode terminal.

In the above rechargeable battery, the insulation gasket protrudes from the case, wherein the electrode terminal protrudes from the insulation gasket.

In the above rechargeable battery, a vertex of the electrode terminal and a vertex of the insulation gasket form a first slope that is less than a second slope formed by the vertex of the electrode terminal and a vertex of the case.

In the above rechargeable battery, the case has a first side and a second side shorter than the first side, wherein the first side crosses the first and second slopes.

The rechargeable battery of claim 1, further comprising a bus bar electrically connected to the electrode terminal.

In the above rechargeable battery, the case has a first side and a second side shorter than the first side, wherein the bus bar crosses the first side of the case and extends to the environment.

In the above rechargeable battery, the bus bar is formed of a flexible conductive member.

Another aspect is a rechargeable battery comprising: a case including a cap plate having a top surface; an insulation gasket placed over the cap plate and having a first perimeter; and an electrode terminal overlapping the insulation gasket in the height dimension of the rechargeable battery, wherein the electrode terminal has a second perimeter that is less than the first perimeter.

In the above rechargeable battery, the electrode terminal has a first exposed area, and the insulation gasket has a second exposed area that is greater than or equal to the first exposed area.

In the above rechargeable battery, the electrode terminal completely overlaps the insulation gasket in the thickness direction of the electrode terminal.

The above rechargeable battery further comprises a bus bar electrically connected to the electrode terminal.

In the above rechargeable battery, the electrode terminal and the insulation gasket satisfy the relationship of a>b, wherein "a" represents a first distance between a first side of the electrode terminal and a first side of the insulation gasket parallel to each other, and wherein "b" represents a second distance between a second side of the electrode terminal and a second side of the insulation gasket parallel to each other.

Another aspect is a rechargeable battery comprising: a plurality of batteries; a plurality of cases accommodating the respective battery; a plurality of insulation gaskets each placed over the respective case; a plurality of electrode terminals each only partially covering the respective insulation gasket; and a bus bar contacting the electrode terminals and electrically insulated from the case.

In the above rechargeable battery, each electrode terminal has a first exposed area, and each insulation gasket has a second exposed area that is greater than or equal to the first exposed area.

In the above rechargeable battery, the bus bar extends farther than a vertical side of each of the cases.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed.

Hereinafter, rechargeable batteries will be described with reference to the accompanying drawings, in which exemplary embodiments are shown. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 1:
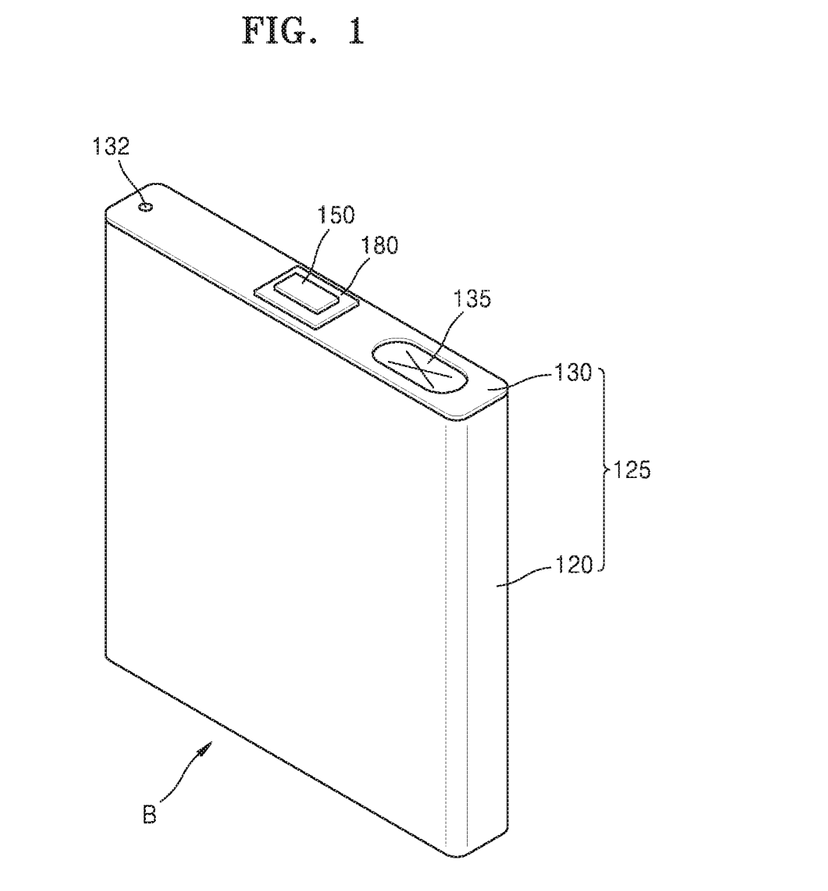
FIG. 1 is a perspective view illustrating a rechargeable battery according to an exemplary embodiment.
Figure 2:
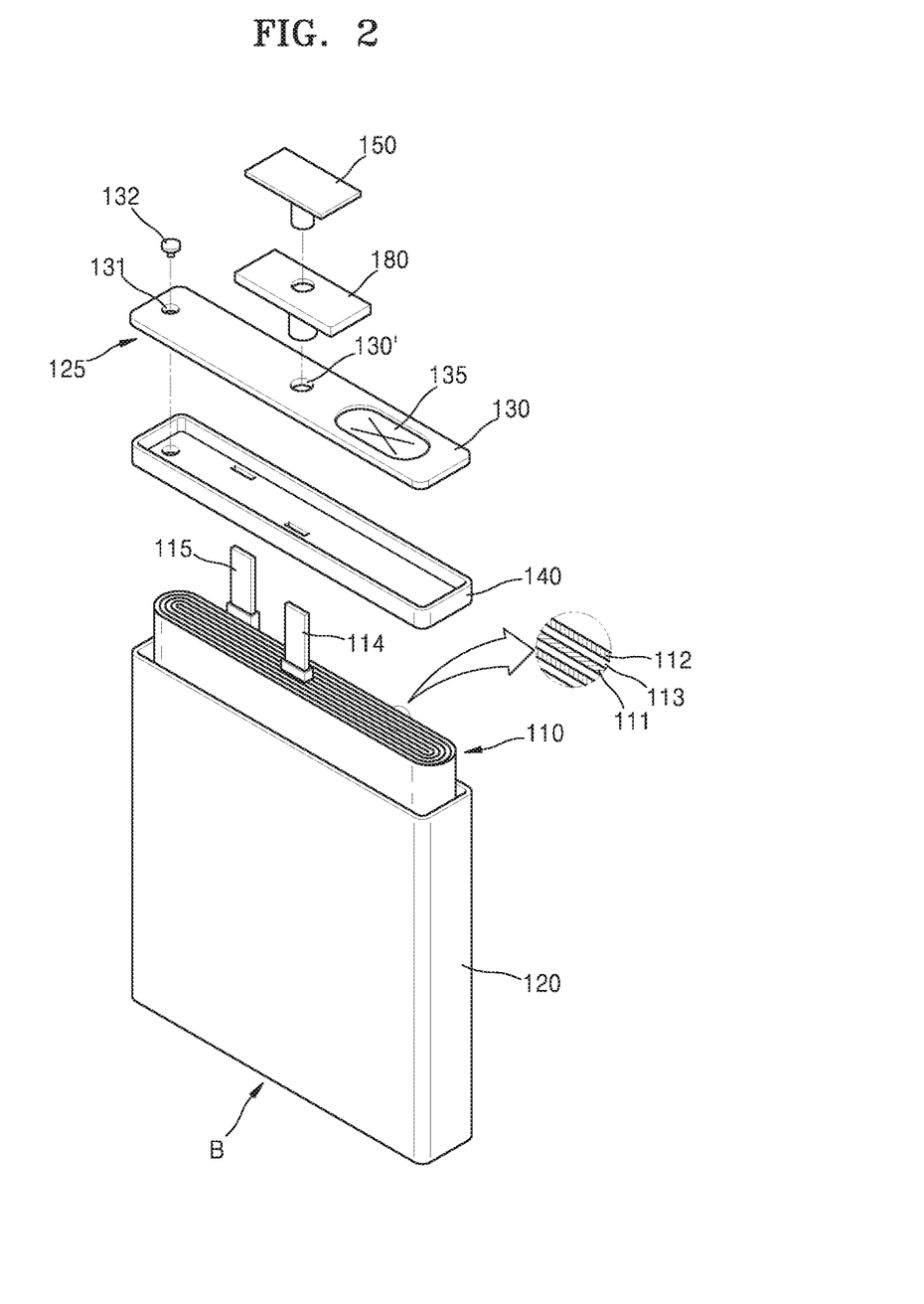
FIG. 2 is an exploded perspective view illustrating the rechargeable battery depicted in FIG. 1.

FIG. 1 is a perspective view illustrating a rechargeable battery B according to an exemplary embodiment. FIG. 2 is an exploded perspective view illustrating the rechargeable battery B depicted in FIG. 1.

Referring to FIGS. 1 and 2, the rechargeable battery B includes an electrode assembly 110, a case 125 accommodating the electrode assembly 110, an electrode terminal 150 exposed on an upper surface of the case 125, and an insulation gasket 180 disposed between the case 125 and the electrode terminal 150.

The electrode assembly 110 may include first and second electrode plates 111 and 112 having different polarities, and a separator 113 disposed between the first and second electrode plates 111 and 112. For example, the first electrode plate 111 may be electrically connected to the electrode terminal 150, and the second electrode plate 112 may be electrically connected to the case 125. The insulation gasket 180 may be disposed between the electrode terminal 150 and the case 125 to which the first and second electrode plates 111 and 112 are respectively connected, so as to prevent a short circuit between the electrode terminal 150 and the case 125.

The first electrode plate 111 may be electrically connected to the electrode terminal 150 through a first electrode lead 114, and the second electrode plate 112 may be electrically connected to the case 125 through a second electrode lead 115. The first and second electrode leads 114 and 115 may be electrically connected to the first and second electrode plates 111 and 112 and may extend from the first and second electrode plates 111 and 112, respectively.

The case 125 may include a can 120 accommodating the electrode assembly 110, and a cap plate 130 closing an opening of the can 120. The cap plate 130 may include an inlet 131 to inject an electrolyte into the case 125 through the inlet 131, and a sealing member 132 to close the inlet 131.

The cap plate 130 may include a safety vent 135 having a relatively low degree of strength. Thus, if the internal pressure of the case 125 increases to a preset critical point or higher, the internal pressure of the case 125 may be reduced using the safety vent 135. For example, if the internal pressure of the case 125 increases to the critical point or higher, the safety vent 135 may be broken to release the internal pressure of the case 125, thereby preventing explosions or fires.

The electrode terminal 150 may be inserted through a terminal hole 130' of the cap plate 130. At this time, the insulation gasket 180 may be disposed between the electrode terminal 150 and the cap plate 130 to which the first and second electrode leads 114 and 115 having different polarities are respectively connected. For example, the electrode terminal 150 may be coupled to the cap plate 130 in a state in which the electrode terminal 150 is insulated from the cap plate 130 by the insulation gasket 180.

Figure 3:
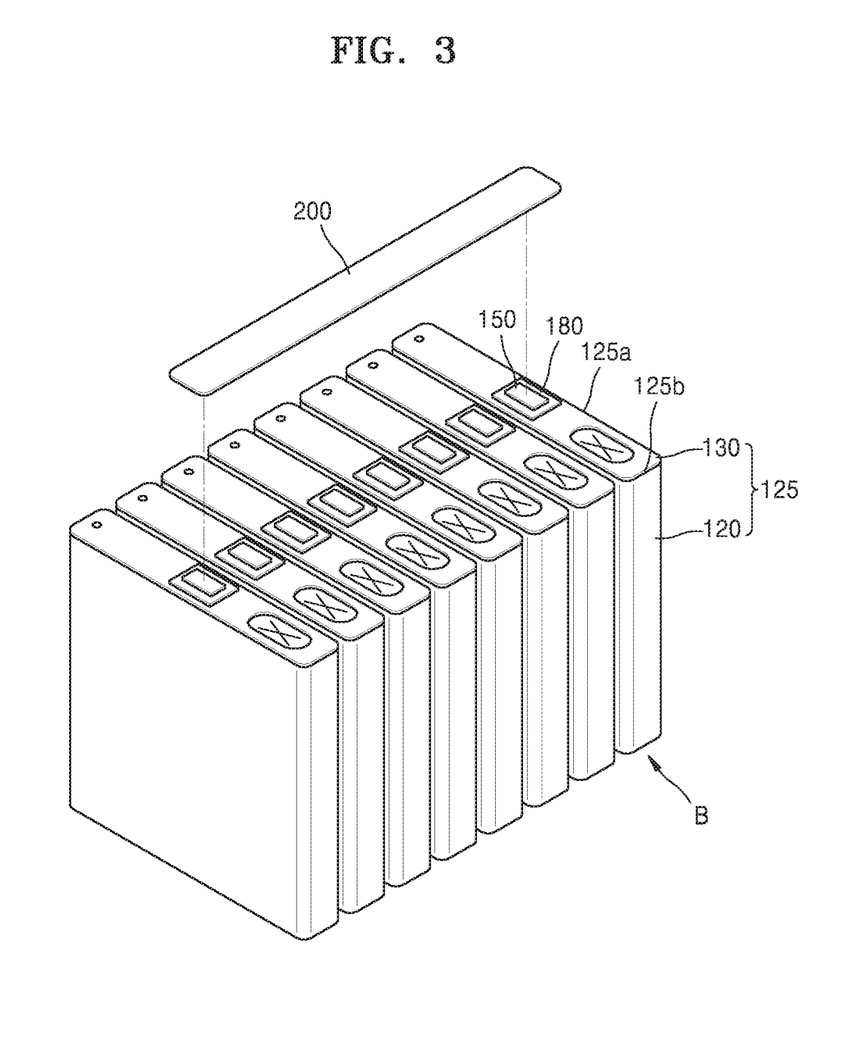
FIG. 3 is a view illustrating a battery pack including rechargeable batteries according to an exemplary embodiment.

FIG. 3 is a view illustrating a battery pack including rechargeable batteries B according to an exemplary embodiment.

Referring to FIG. 3, the battery pack includes a plurality of rechargeable batteries B such as the rechargeable battery B illustrated in FIGS. 1 and 2. The rechargeable batteries B may be electrically connected to each other through the electrode terminals 150 of the rechargeable batteries B. As shown in FIG. 3, the electrode terminals 150 may be connected to each other through a bus bar 200 extending across the rechargeable batteries B arranged in a line. The rechargeable batteries B may be connected in parallel. However, the described technology is not limited thereto. For example, the rechargeable batteries B of the battery pack may be electrically connected to each other by any method such as a series connection method, a parallel connection method, or a series-parallel connection method. The bus bar 200 may be formed of a flexible conductive material such as metal tape.

The cases 125 of the rechargeable batteries B may have a rectangular shape with a pair of long sides 125a and a pair of short sides 125b. For example, the bus bar 200 may extend across the long sides 125a of the cases 125 of the rechargeable batteries B arranged in a line and may electrically connect the rechargeable batteries B to each other.

Figure 4:
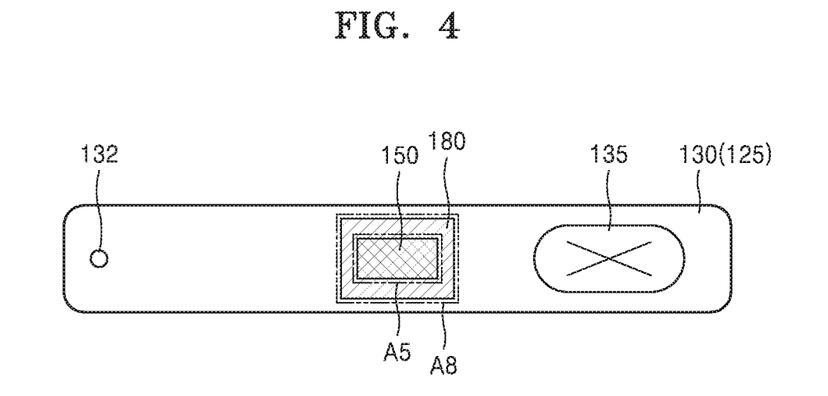
FIGS. 4 and 5 are views for illustrating design specifications of an insulation gasket according to an exemplary embodiment.
Figure 5:
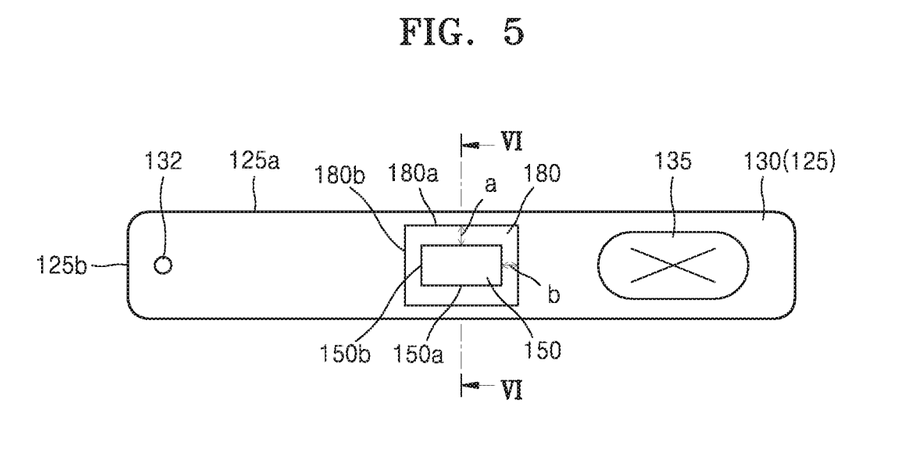

FIGS. 4 and 5 are views for illustrating design specifications of the insulation gasket 180 according to an exemplary embodiment.

Referring to FIG. 4, the insulation gasket 180 surrounds the electrode terminal 150 and electrically insulates the electrode terminal 150 from the case 125. The insulation gasket 180 may have an exposed area A8 equal to or greater than an exposed area A5 of the electrode terminal 150 (A8≥A5). Herein, the exposed area A8 of the insulation gasket 180 refers to an exposed area of the insulation gasket 180 not covered with the electrode terminal 150 when viewed from the upper side of the case 125. For example, the exposed area A8 is the top surface area of the insulation gasket (180) minus the top surface area of the electrode terminal (150). The exposed area A8 of the insulation gasket 180 does not overlap the exposed area A5 of the electrode terminal 150 and corresponds to a region of the insulation gasket 180 not including a region covered with the exposed area A5 of the electrode terminal 150. Similarly, the exposed area A5 of the electrode terminal 150 refers to an exposed area of the electrode terminal 150 not covered with the insulation gasket 180.

According to an exemplary embodiment, the electrode terminal 150 is disposed on top of the insulation gasket 180, and thus the electrode terminal 150 is not covered with the insulation gasket 180. Therefore, the total area of the electrode terminal 150 exposed on an upper surface of the case 125 may correspond to the exposed area A5.

When assembled, the electrode terminal 150 penetrates the case 125 to make electric connection with an electrode assembly 110 disposed in the case 125. At this time, the electrode terminal 150 is coupled to the case 125 with the insulation gasket 180 being disposed therebetween. For example, an exposed region of the insulation gasket 180 not including an overlapping region with the electrode terminal 150 may correspond to the exposed area A8, and an exposed region of the electrode terminal 150 may correspond to the exposed area A5.

Due to the exposed area A8 of the insulation gasket 180, a short circuit may not be formed between the electrode terminal 150 and the case 125. As shown in FIG. 3, when the electrode terminals 150 are connected to each other using the bus bar 200, if the bus bar 200 is not exactly placed and is thus brought into contact with an electrode terminal 150 and a case 125, a short circuit may be formed between the electrode terminal 150 and the case 125 through the bus bar 200. However, since the insulation gaskets 180 surrounding the electrode terminals 150 provide sufficient insulation areas (the exposed areas A8 of the insulation gaskets 180) around the electrode terminals 150, the electrode terminals 150 and the cases 125 may not be electrically connected, thereby preventing short circuits. That is, even though the bus bar 200 is inexactly placed, if the bus bar 200 is within the exposed areas A8 of the insulation gaskets 180, the bus bar 200 may not be brought into contact with the cases 125.

If the exposed areas A8 of the insulation gaskets 180 are not sufficiently large, the bus bar 200 may be placed outside the exposed areas A8 and may be brought into contact with the cases 125 to cause short circuits between the cases 125 and the electrode terminals 150. Therefore, according to an exemplary embodiment, the lower limit of the exposed areas A8 of the insulation gaskets 180 may be set so as to provide sufficient insulation areas around the electrode terminals 150. For example, the exposed area A8 of each insulation gasket 180 may be substantially equal to or greater than the exposed area A5 of each electrode terminal 150 (A8≥A5). In this case, a sufficient insulation area may be provided around the electrode terminal 150, and the possibility of a short circuit may be minimized when the bus bar 200 is connected. Since the exposed area A5 of the electrode terminal 150 is an exposed area making contact with the bus bar 200, if the exposed area A8 surrounding the exposed area A5 is substantially equal to or greater than the exposed area A5, a short circuit may be prevented even though the bus bar 200 is not exactly connected.

In addition, the exposed area A8 of the insulation gasket 180 may completely surround the exposed area A5 of the electrode terminal 150. For example, the insulation gasket 180 may be disposed to completely surround the electrode terminal 150, and thus any portion of outer edges of the electrode terminal 150 may not be exposed to the outside without being surrounded by the insulation gasket 180. The insulation gasket 180 may completely surround the outer edges of the electrode terminal 150 to prevent a short circuit between the electrode terminal 150 and the case 125 when the bus bar 200 is connected.

As shown in FIG. 5, the insulation gasket 180 has a quadrangular shape with first sides 180a substantially parallel with the long sides 125a of the case 125 and second sides 180b substantially parallel with the short sides 125b of the case 125. The electrode terminal 150 may be disposed within the region of the insulation gasket 180 and may have a quadrangular shape with first sides 150a substantially parallel with the long sides 125a of the case 125 and second sides 150b substantially parallel with the short sides 125b of the case 125. The distance (a) between the first sides 180a and 150a of the insulation gasket 180 and the electrode terminal 150 may be greater than the distance (b) between the second sides 180b and 150b of the insulation gasket 180 and the electrode terminal 150 (a>b).

The distance (a) between the first sides 180a and 150a of the insulation gasket 180 and the electrode terminal 150 may refer to an insulation distance from the electrode terminal 150 provided along the first sides 180a and 150a in a direction substantially perpendicular to the first sides 180a and 150a. For example, although the bus bar 200 is not connected perfectly, if the bus bar 200 is within the distance (a) between the first sides 180a and 150a of the insulation gasket 180 and the electrode terminal 150, a short circuit can be prevented.

Similarly, the distance (b) between the second sides 180b and 150b of the insulation gasket 180 and the electrode terminal 150 may refer to an insulation distance from the electrode terminal 150 provided along the second sides 180b and 150b in a direction substantially perpendicular to the second sides 180b and 150b. For example, although the bus bar 200 is not precisely connected, if the bus bar 200 is within the distance (b) between the second sides 180b and 150b of the insulation gasket 180 and the electrode terminal 150, a short circuit can be formed prevented.

The distance (a) between the first sides 180a and 150a may be set to be greater than the distance (b) between the second sides 180b and 150b, so as to prevent erroneous contact of the bus bar 200 in a direction substantially perpendicular to the first sides 180a and 150a when the bus bar 200 is connected. The bus bar 200 may be formed of flexible metal tape and may be manually connected. A worker may connect the bus bar 200 by attaching the bus bar 200 to the electrode terminals 150 of the rechargeable batteries B in an arrangement direction of the rechargeable batteries B. The bus bar 200 may extend across the long sides 125a of the cases 125, that is, across the first sides 150a of the electrode terminals 150. The bus bar 200 may extend across the first sides 150a of an electrode terminal 150 to the outside of a case 125 and may then be connected to a neighboring electrode terminal 150. When the bus bar 200 is attached in the arrangement direction of the rechargeable batteries B, the bus bar 200 may be attached to an inexact position, and if the inexact position is not within the distance (a) between the first sides 180a and 150a, the bus bar 200 may be short-circuited with the case 125.

Therefore, the distance (a) between the first sides 180a and 150a of the insulation gasket 180 and the electrode terminal 150 may be set to be greater than the distance (b) between the second sides 180b and 150b of the insulation gasket 180 and the electrode terminal 150 (a>b). That is, the distance (a) between the first sides 180a and 150a may be relatively large.

Figure 6A:
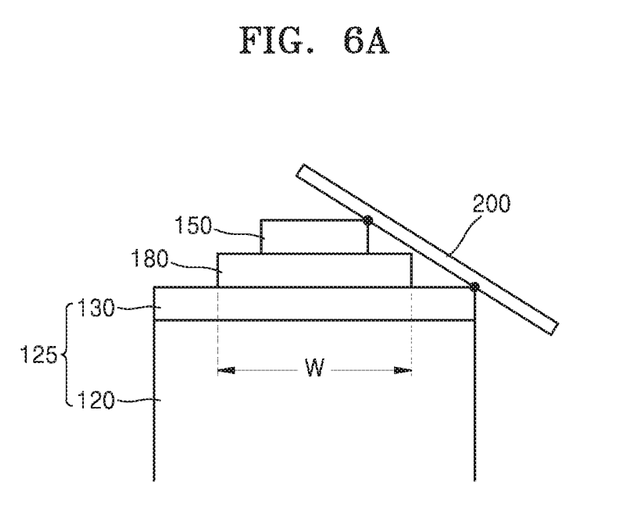
FIGS. 6A and 6B are cross-sectional views taken along line VI-VI of FIG. 5 for illustrating a state of a bus bar forming a short-circuit path and another state of the bus bar forming an insulation path.
Figure 6B:
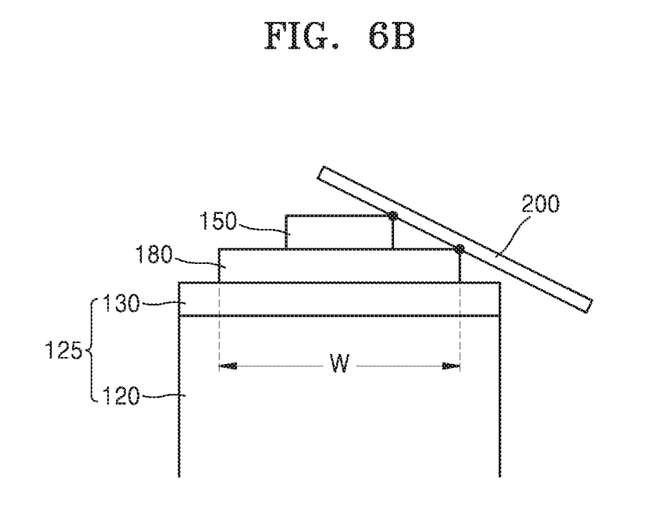

FIGS. 6A and 6B are cross-sectional views taken along line VI-VI of FIG. 5 for illustrating a state of the bus bar 200 forming a short-circuit path and another state of the bus bar 200 forming or an insulation path.

Referring to FIG. 6A, when the bus bar 200 is connected in the arrangement direction of the rechargeable batteries B, the bus bar 200 may form a short-circuit path between the electrode terminal 150 and the case 125. Referring to FIG. 6B, the bus bar 200 may form an insulation path between the electrode terminal 150 and the insulation gasket 180. Note that the bus bar (200) does not contact the cap plate (130). Referring to FIGS. 6A and 6B, the bus bar 200 may form a short-circuit path or an insulation path depending on the width W of the insulation gasket 180. If the width W of the insulation gasket 180 is relatively small, for example, if the slope of the bus bar 200 connected to the electrode terminal 150 at an angle is relatively large, the bus bar 200 may form a short-circuit path. Conversely, if the width W of the insulation gasket 180 is relatively large, for example, if the slope of the bus bar 200 connected to the electrode terminal 150 at an angle is relatively small, the bus bar 200 may form an insulation path.

Figure 7A:
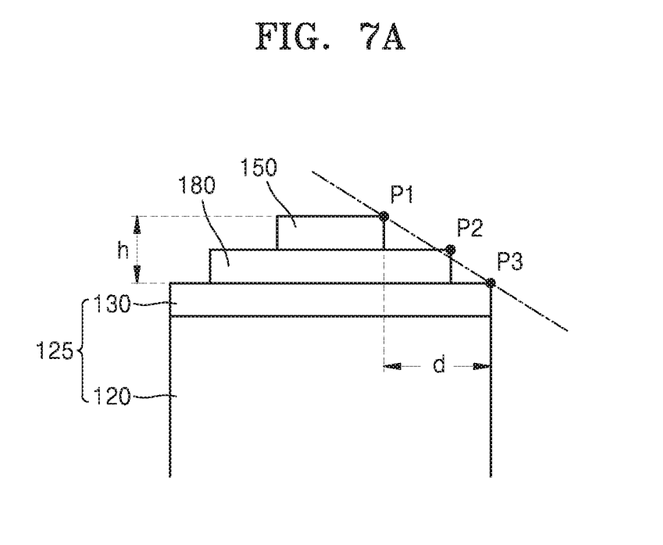
FIGS. 7A and 7B are views for illustrating design specifications for the insulation gasket according to an exemplary embodiment.
Figure 7B:
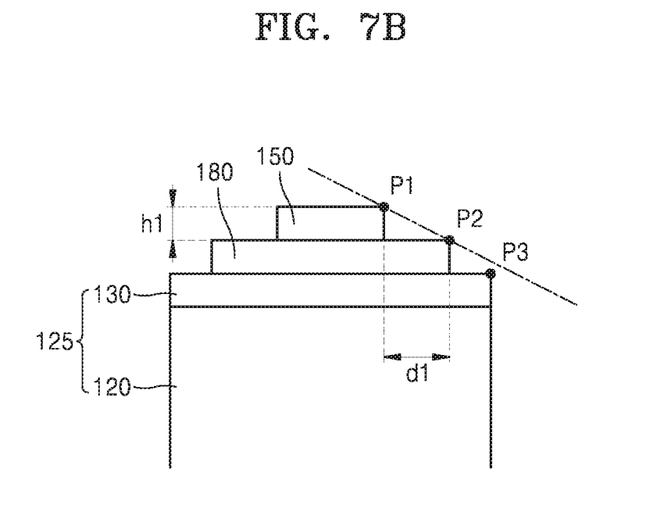

FIGS. 7A and 7B are views for illustrating design specifications for the insulation gasket 180 according to an exemplary embodiment.

Referring to FIG. 7A, if the bus bar 200 has a short-circuit path slope h/d (a second slope in claims) defined between a contact point P1 of the electrode terminal 150 and a contact point P3 of the case 125, the bus bar 200 may form a short-circuit path. Here, h may refer to the distance of the top surface of the electrode terminal 150 measured from the case 125, and d may refer to a distance between ends of the case 125 and the electrode terminal 150 in the width direction of the case 125.

Referring to FIG. 7B, if the bus bar 200 has an insulation path slope h1/d1 (a first slope in claims) defined between the contact point P1 of the electrode terminal 150 and a contact point P2 of the insulation gasket 180, the bus bar 200 may form an insulation path. Here, h1 may refer to the height of the electrode terminal 150 measured from the insulation gasket 180, and d1 may refer to a distance between ends of the insulation gasket 180 and the and the electrode terminal 150 in the width direction of the case 125.

In the exemplary embodiment, if the short-circuit path slope h/d (second slope) is greater than the insulation path slope h1/d1 (first slope) (h/d>h1/d1), the bus bar 200 may not form a short-circuit path. For example, if the insulation path slope h1/d1 (first slope) is smaller than the short-circuit path slope h/d (second slope), the bus bar 200 may not form a short-circuit path. For example, if the insulation path slope h1/d1 (first slope) is smaller than the short-circuit path slope h/d (second slope), a point of the bus bar 200 contacts the contact point P1 of the electrode terminal 150 but another point of the bus bar 200 does not contact the case 125. For example, the other point of the bus bar 200 is separate from the case 125.

For ease of description, FIG. 7A shows a point of the bus bar 200 that contacts the contact point P1 of the electrode terminal 150, and another point of the bus bar 200 makes contact with the contact point P3 of the case 125. However, the bus bar 200 contacting the contact point P1 of the electrode terminal 150 may not contact the contact point P3 of the case 125 in a path bypassing the contact point P2 of the insulation gasket 180 protruding outward.

The above-described relationship between the insulation path slope h1/d1 (first slope) and the short-circuit path slope h/d (second slope) of the bus bar 200 may be obtained from a section crossing the long sides 125a of the case 125 as illustrated in FIGS. 7A and 7B. That is, design variables such as h, d, h1, and d1 may be defined in a section crossing the long sides 125a of the case 125. The reason for this is that the bus bar 200 extends across the long sides 125a of the case 125.

As described above, according to at least one of the disclosed embodiments, design specifications for insulation gaskets are provided for insulation between electrode terminals and cases. Also, when a plurality of rechargeable batteries are electrically connected using a bus bar, the bus bar does not short-circuit electrode terminals and cases, and since insulation gaskets provide sufficient insulation areas around the electrode terminals, short-circuit paths are not formed between the electrode terminals and the cases.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A rechargeable battery comprising:
    a case;
    an electrode terminal connected to the case and having a first exposed area; and
    an insulation gasket interposed between the electrode terminal and the case and partially covered by the electrode terminal, wherein the insulation gasket has a second exposed area, and wherein the second exposed area is greater than or equal to the first exposed area, wherein the electrode terminal has a quadrangular shape having first and second sides extending in different directions, wherein the insulation gasket surrounds the electrode terminal and has a quadrangular shape having first and second sides substantially parallel with the first and second sides of the electrode terminal, respectively, wherein the electrode terminal and the insulation gasket satisfy the relationship of a>b, where "a" represents the distance between the first sides of the electrode terminal and the insulation gasket, and where "b" represents the distance between the second sides of the electrode terminal and the insulation gasket.

2. The rechargeable battery of claim 1, wherein the second exposed area completely surrounds the first exposed area.

3. The rechargeable battery of claim 1, wherein the case has a first side and a second side shorter than the first side, wherein the first sides of the electrode terminal and the insulation gasket are substantially parallel with the first side of the case, and wherein the second sides of the electrode terminal and the insulation gasket are substantially parallel with the second side of the case.

4. The rechargeable battery of claim 1, further comprising a bus bar electrically connected to the electrode terminal, wherein the bus bar crosses the first side of the electrode terminal.

5. The rechargeable battery of claim 1, wherein the insulation gasket protrudes from the case, and wherein the electrode terminal protrudes from the insulation gasket.

6. The rechargeable battery of claim 1, wherein the case includes a cap plate having a top surface that contacts the insulation gasket, wherein the electrode terminal has top and bottom surfaces opposing each other, wherein the bottom surface contacts the insulation gasket, wherein a short-circuit path slope is defined as h/d, wherein an insulation path slope is defined as h1/d1, wherein the short-circuit path slope (h/d) is greater than the insulation path slope (h1/d1), where "h" represents the distance between the top surface of the electrode terminal and the top surface of the cap plate, where "d" represents the distance between ends of the case and the electrode terminal measured in the direction of the width of the case, where "h1" represents the height of the electrode terminal measured from the insulation gasket, and where "d1" represents the distance between ends of the insulation gasket and the electrode terminal measured in the direction of the width of the case.

7. The rechargeable battery of claim 1, further comprising a bus bar electrically connected to the electrode terminal.

8. The rechargeable battery of claim 7, wherein the case has a first side and a second side shorter than the first side, and wherein the bus bar crosses the first side of the case and extends to the environment.

9. The rechargeable battery of claim 7, wherein the bus bar is formed of a flexible conductive member.

10. A rechargeable battery comprising:
a case including a cap plate having a top surface;
an insulation gasket placed over the cap plate and having a first perimeter; and
an electrode terminal overlapping the insulation gasket in the height dimension of the rechargeable battery, wherein the electrode terminal has a second perimeter that is less than the first perimeter, wherein the electrode terminal and the insulation gasket satisfy the relationship of a>b, where "a" represents a first distance between a first side of the electrode terminal and a first side of the insulation gasket parallel to each other, and where "b" represents a second distance between a second side of the electrode terminal and a second side of the insulation gasket parallel to each other.

11. The rechargeable battery of claim 10, wherein the electrode terminal has a first exposed area, and the insulation gasket has a second exposed area that is greater than or equal to the first exposed area.

12. The rechargeable battery of claim 11, wherein the electrode terminal completely overlaps the insulation gasket in the thickness direction of the electrode terminal.

13. The rechargeable battery of claim 12, further comprising a bus bar electrically connected to the electrode terminal.

14. A rechargeable battery comprising:
a plurality of batteries;
a plurality of cases accommodating the respective battery;
a plurality of insulation gaskets each placed over the respective case;
a plurality of electrode terminals each only partially covering the respective insulation gasket; and
a bus bar contacting the electrode terminals and electrically insulated from the case, wherein each of the electrode terminals and the corresponding insulation gasket satisfy the relationship of a>b, where "a" represents a first distance between a first side of the electrode terminal and a first side of the insulation gasket parallel to each other, and where "b" represents a second distance between a second side of the electrode terminal and a second side of the insulation gasket parallel to each other.

15. The rechargeable battery of claim 14, wherein each electrode terminal has a first exposed area, and each insulation gasket has a second exposed area that is greater than or equal to the first exposed area.

16. The rechargeable battery of claim 15, wherein the bus bar extends farther than a vertical side of each of the cases.

17. The rechargeable battery of claim 10, wherein the electrode terminal has top and bottom surfaces opposing each other, wherein the bottom surface contacts the insulation gasket, wherein a short-circuit path slope is defined as h/d, wherein an insulation path slope is defined as h1/d1, wherein the short-circuit path slope (h/d) is greater than the insulation path slope (h1/d1), where "h" represents the distance between the top surface of the electrode terminal and the top surface of the cap plate, where "d" represents the distance between ends of the case and the electrode terminal measured in the direction of the width of the case, where "h1" represents the height of the electrode terminal measured from the insulation gasket, and where "d1" represents the distance between ends of the insulation gasket and the electrode terminal measured in the direction of the width of the case.

* * * * *